United States Patent [19]

Nelson

[11] 4,247,561

[45] Jan. 27, 1981

[54] PROCESS AND METHOD OF USE FOR A STABLE EMULSIFIED EDIBLE LIQUID STARCH PRODUCT

[76] Inventor: Rolland W. Nelson, 2104 Maury St., Des Moines, Iowa 50301

[21] Appl. No.: 30,223

[22] Filed: Apr. 16, 1979

Related U.S. Application Data

[63] Continuation-in-part of Ser. No. 867,809, Jan. 9, 1978, Pat. No. 4,167,584.

[51] Int. Cl.³ .............................................. A23K 1/00
[52] U.S. Cl. ...................................... 426/53; 426/54; 426/93; 426/623; 426/630; 426/635; 426/309; 426/310; 426/807; 426/661
[58] Field of Search ................ 426/309, 310, 2, 53, 426/54, 28, 44, 48, 69, 602, 335, 532, 661, 623, 630, 635, 807, 29, 89, 93

[56] References Cited

U.S. PATENT DOCUMENTS

| | | | |
|---|---|---|---|
| 2,776,890 | 1/1957 | Kunz | 426/335 X |
| 3,895,117 | 7/1975 | Backlund | 426/69 |
| 3,988,483 | 10/1976 | Deyoe et al. | 426/69 X |
| 4,089,979 | 5/1978 | Jackson | 426/807 X |
| 4,167,584 | 9/1979 | Nelson | 426/807 X |

*Primary Examiner*—R. B. Penland
*Attorney, Agent, or Firm*—Zarley, McKee, Thomte, Voorhees & Sease

[57] ABSTRACT

A method of making a stable, emulsified, liquid starch product which comprises from about 45% to about 85% edible liquid, and from about 15% to about 55% of a whole, non-starch isolated, starch bearing material emulsified with said edible liquid. The method comprises size reducing the starch material, slurrying the size reduced material with edible liquid, hydrothermally cooking the slurried mixture, and holding said hydrothermally cooked mixture at the temperature at which it exits from the hydrothermal cooker for from one to four minutes in order to significantly increase gelatinization and maltose values. It has also been found when this is done, lactic acid levels are increased which significantly improves the product. Finally, it has been found that the product can be used as an effective grain and silage sealer, which is also nutritional.

10 Claims, No Drawings

PROCESS AND METHOD OF USE FOR A STABLE EMULSIFIED EDIBLE LIQUID STARCH PRODUCT

CROSS REFERENCE TO A RELATED APPLICATION

This application is a continuation-in-part of co-pending application Ser. No. 867,809 filed Jan. 9, 1978 now U.S. Pat. No. 4,167,584.

BACKGROUND OF THE INVENTION

This invention relates to a liquid starch product suitable for use by livestock and other animals. The product is suitable for use by monogastric animals, such as hogs, chickens and other poultry, ruminants, such as cattle, sheep and goats, and pseudo-ruminants such as horses, rabbits and the like. In short, the product is a suitable feed, or feed supplement, for all domestic livestock.

While liquid starch products have been prepared in the past, such products have not met with a great deal of commercial success. This has primarily resulted from inherent deficiencies in the product. For example, many previous liquid products have not been suitable due to the lack of emulsion stability. Many of these other products also have much of the starch removed. Thus, the products when shipped and stored for a period of time separate into a solids lower layer and an unsightly but distinct top liquid layer. This makes the product unacceptable for use without chemical emulsifiers, or mixing before use. As a result of such poor performance characteristics, such products have been received with less than total enthusiasm by livestock feeders.

The product of this invention provides a liquid starch product, in an emulsion form, which has emulsion stability for periods of time up to as long as nine months, but more typically for several months, i.e., three to six months. As a result, the product has good storage properties and a long shelf life.

In addition to the advantage of emulsion stability, good storage capabilities and long shelf life, the product of this invention also have the unique capability of replacing up to as much as 5% to 10% of the dry grain in a dry feed ration. It also functions as a feed conditioner and eliminates the need for the pelletizing of some feeds, without any significant difference in animal weight gain or feed conversion being noted. As a result, feed costs can be significantly decreased, by utilizing a portion of a cheaper feed product without any corresponding decrease in feed efficiency, since the feed conversion to protein (meat) remains constant.

Accordingly, the principal objects of this invention are to provide a method of preparing a liquid starch based edible product which has a good shelf life, has long storage capability, which is a stable emulsion, and which can effectively be used as a substitute for either a portion of dry grain or mechanically pelletizing, or both, thereby decreasing feed costs. And importantly the substitution is made without any corresponding decrease in feed efficiency.

Another object is to develop a method for preparing an improved liquid starch product having an improved maltose value, a naturally high lactose level, and which needs less size reduction pretreatment than my prior processed starch product.

Yet another object is to prepare a product which can be used as an effective, and nutritious grain and/or silage sealer.

The means of accomplishing the above and other objects of the invention will become apparent from the detailed description of the invention which follows.

SUMMARY OF THE INVENTION

This invention relates to an improved method of preparation of a stable emulsified liquid starch product which has increased maltose values, and thus improved digestability. It also has a naturally high lactose level; and it is less sensitive to initial size reduction pretreatment steps, thereby reducing power consumption in the overall processing.

Maltose values are improved and the need for extremely small particle size reduction, in the initial size reducing pretreatment step, is minimized by the discovery that a hold time of from one to four minutes at temperatures at which material exists from the hydrothermal cooker will, in many cases, double maltose values and provide an inherent reduction in particle size at this stage of the processing. It has also been discovered that partial recycle of slurry water from the hold tank for hydrothermally processed material, to the initial mixing tank results in increasing the lactic acid level to within the range of 3% to 10% by weight and more commonly within the preferred range of 4% to 6%.

DETAILED DESCRIPTION OF THE INVENTION

It is important to note that the starch bearing material which is utilized to make the liquid starch product of this invention is a whole starch material. The term "whole starch material" as used herein, is intended to distinguish from isolated starches wherein a starch source material is segregated into starch materials and nonstarch materials. In this invention, the source material is not segregated. As a result, the whole starch bearing material which is utilized includes the starch, as well as fat, cellulose, and protein materials.

The exact starch bearing source material utilized in this invention is not critical, as long as it is used in its whole form. It can include conventional grains such as corn, wheat, milo, barley, oats, rye, soybeans, rice, tuber starches such as potatoes, or any other starch bearing source material.

As an initial pretreatment step, it is preferred that the whole starch bearing material be run through a grain scalper or the like to remove adulterating foreign materials.

In the initial step of U.S. Pat. No. 4,167,584, the whole starch source material is size reduced to an average particle size of 300 microns or smaller. It has now been discovered that if the requisite hold time described below for materials exiting from the hydrothermal cooker are employed, size reduction need not be accomplished to the small size of 300 microns or smaller. Thus, in accordance with this improved process, initial size reduction can be to sizes of 400 to 500 microns and it is still possible to make a stable emulsion. The net effect is an overall power demand reduction which results in energy savings.

Size reduction of the whole starch source material can be accomplished by conventional means such as a hammer mill, ball mill, conventional grinding, entolators, pin mills, or the like. The important factor not being the precise mechanical means of size reduction, but that the size of the particles is reduced sufficiently such that a stable liquid emulsion product will be produced in the hereinafter described steps. Generally, if the improved hold step provide increased cooking and gelatinization of this invention is accomplished initial size reduction can be to particles as large as 400 to 500 microns.

After the whole starch material has been size reduced the starch material is thereafter slurried with an edible liquid, preferably water.

If fat is to be added, from 0.5% to 25% fat by weight of said product can be added to the slurry before cooking. The added fat should be warm and flowable. No fat layer was observed in the final product after three months of storage. Even when oil seeds such as soya beans, peanuts, sunflower seeds are used as the starch source, no layering of the naturally occurring fat was observed for a period of three months. The added fat, when used, replaces a corresponding amount of the water.

The slurry should comprise from about 45% to about 85% water, and correspondingly from 15% to about 55% solids materials. Preferably the slurry comprises from about 60% to about 75% liquid and from about 25% to about 40% solids or in other words, from about 25% to about 40% of the whole starch source material which has been size reduced. It is important that the solids level of the slurry be maintained within the ranges specified herein in order that a uniform slurry is obtained having good flow characteristics, excellent handling characteristics, and which is suitable for subsequent processing steps. When the percentage of solids specified herein are not employed, stable product emulsions are often not obtained.

Slurrying can be accomplished in any conventional manner and a conventional batch liquid mixer may be employed or continuous mixing devices may be employed in a conventional slurry tank. The water utilized in the slurry may be warm water or cold water, the temperatures not being critical at this stage of the process.

After mixing has continued to the point where the slurry is uniform and homogeneous, the slurried whole starch material is ready for the hydrothermal cooking step.

In the hydrothermal cooking step, the slurried whole starch source material, having a particle size as previously specified herein, is cooked to at least partially gelatinize the starch material. Cooking may be with or without pressure and the time limit of cooking is not critical as long as at least partial gelatinization occurs.

It is well known to those skilled in the art, gelatinization or more accurately the degree thereof, can be tested by conventional means.

If pressure is employed during the cooking process temperatures up to 250° F. can be conveniently employed during the cooking procedure. A preferred type of hydrothermal cooker has been found to be a jet cooker since it nearly instantaneously cooks and partially gelatinizes the whole starch source material. Such a jet cooker generally comprises a jacketed pipe having a restricted orifice at one end. Steam is introduced through the jacket and the material to be cooked passes through the inner pipe. Such a cooker is shown in U.S. Pat. No. 3,988,483.

A typical jet cooker is made and sold by Hydrothermal Corporation of Milwaukee, Wisconsin. Very satisfactory results have been utilized when employing their Hydro-Heater 800 which has a through put capacity of 3678 gallons per hour, employs low pressure steam up to 100 P.S.I. in the jacket, cooks at temperatures within the range of 205° F. to 250° F. and will provide nearly instantaneous cooking and partial gelatinization of the starch material employed herein. Where other types of non-pressure cooking vessels are employed, it should be understood that longer process times may be necessary to achieve gelatinization of the starch material. For example, cooking times of up to one hour may be necessary at or near the boiling point of water.

In my previous process, material exiting from the hydrothermal cooker such as a jet cooker, was immediately conveyed to a hold tank. It has now been discovered that if the material is held at the temperature at which it exits from the hydrothermal cooker for a period of from one to four minutes and preferably from two to three minutes, the maltose value of the product is significantly increased.

As those skilled in the art know, maltose values are a measure of the extent of cooking and gelatinization and are therefore an indication of the degree of cooking. Higher values represent greater cooking. Correspondingly, as the maltose value is increased, the digestability and availability of nutrients in the material as a feed energy sorce are increased. Maltose values are measured in milligrams of maltose per gram of sample. For typical hydrothermally cooked product, maltose values range from 200 up to as much as 350. For a product of this invention employing the improved hold time processing step, maltose values are in the range of 400 to 550, and typically 500 to 550. It is believed that the increase in maltose value occurs because the product is maintained at hydrothermal cooking temperatures for the increased length of time which allows increased cooking and gelatinization of the whole starch source material.

This hold step can be easily accomplished by providing an insulated pipe leading from a hydrothermal cooker to the hereinbefore described for the hydrothermal cooking step, it has been found that a conveying pipe of about three to four inch diameter, of 30 to 40 foot length, well insulated to provide heat retention capacity, will provide sufficient retention time to accomplish the desired results.

After the material is conveyed through the insulated conveying pipe to the cooked slurry hold tank, a small but effective amount of a starch digestible enzyme may be added to the mixture. The purpose of the enzyme is to at least partially hydrolyze some of the cooked starch material with the result being partial conversion to sugars. The precise enzyme employed for this partial hydrolysis is not critical, although amylase is preferred. It should, however, be understood that a cellulase and protease may also be employed, or mixtures of cellulase, amylase and protease. The level of addition of the starch digestible enzyme may vary within the range of from about 0.01% to about 0.1% and is preferably within the range of from about 0.01% to about 0.02%. Very satisfactory results have been achieved with an enzyme addition level of 0.05%. The exact amount of enzyme is not critical, providing that a sufficient amount is added to achieve at least partial enzymatic hydrolysis of the cooked starch material to sugars.

It should be understood that the enzyme should not be added until the temperature of the cooked whole starch source material has decreased to at least 200° F. or lower. If the enzyme is added at above 200° F. the enzyme is often deactivated, killed or otherwise rendered ineffective for hydrolysis.

When the enzyme is added to the cooked whole starch slurry, it is preferably added under conditions of mixing. Mixing may be accomplished in any suitable mixer such as a Hobart mixer, a Ribbon blender, a paddle mixer or the like. Mixing should continue for at least about five minutes, but no longer than 15 minutes. Preferred mixing time is from five minutes to ten minutes. During the mixing operation, while the enzyme is enzymatically hydrolyzing the cooked starch material, care must be taken to not undermix or overmix. If insufficient mixing is employed, the starch material will set up as a gel. Correspondingly, if mixing occurs for too long a period, the product will become thin and watery, making the achievement of a stable emulsion impossible. It has been found that where mixing times within the range specified herein are employed, good results from the standpoint of desirable product viscosity and emulsion stability are achieved.

During this mixing step, it is desirable to maintain the product within a temperature range of from about 150° F. to about 200° F., and always below the boiling point.

It has also been discovered that during the cooling cycle of the cooked starch slurry significant amounts of lactic acid are formed. It has been discovered that a heat stable lactobacilli bacteria is present in the cooked starch slurry. These heat stable lactobacilli organisms do produce significant amounts of lactic acid. The overall lactic acid content of the product is increased to within the range of 3% to 10% and most typically, 4% to 6%. Having an increased lactic acid content is valuable in that it also improves performance of livesock, such as cattle, sheep, goats, swine and poultry.

After the simultaneous mixing and enzymatic hydrolysis step has been completed, the enzyme must be deactivated before the product is ready for packaging and shipment. The enzyme may be deactivated by the addition of a deactivating mineral acid, such as hydrochloric acid, dilute sulfuric acid, phosphoric acid or the like. Preferably phosphoric acid is utilized as the enzyme deactivation acid since it also will function as a nutrient. The level of deactivating acid is not critical; however, satisfactory results have been attained when the enzyme deactivator is added at a level of from about ½% to about 1½% by weight.

A chemical preservative to inhibit mold and spoilage may be added to the product prior to storage and shipment. Such preservatives generally comprise combinations of mineral acids and organic acids and may be added at levels of from about ¼% to about 1% by weight. Other minor ingredients may be added to the product prior to storage and shipment such as flavoring, coloring or the like.

In addition, a freezing point depressant may be added to the product such as salt at levels typically of about 1% by weight.

As heretofore mentioned, the product of this invention, providing it is made as described above and has the physical characteristics as described above, will provide an emulsion having good stability, excellent storage and handling capabilities, including having a viscosity which is desirable from the standpoint of the ultimate product user. The product is not too thin and watery and yet is not so thick that it is not pourable. Moreover, it will provide shelf stability for certain instances up to as long as nine months, and more typically within the range of three to six months. A three to six month shelf stability is generally satisfactory in that the product is, in most instances, sold and consumed within this period of time.

Another surprising advantage of the product of this invention is that it has been found to have a significant advantage as a spray-on sealer for silage or stored corn or the like. When the liquid emulsion product of this invention is sprayed on silage or grain which is to be stored, it provides an effective sealing coating on the treated material. The coating sets up within two to three hours. The result is that conventional sealers need not be employed. Moreover, the product of this invention not only effectively seals but also is nutritionally enhancing.

Conventional spray equipment can be used to spray the product of this invention. If desired, when used as a sealer, for various raw, non-processed agricultural commodities such as hay, silage and grain, its viscosity can be decreased slightly by the addition of increased enzyme levels which makes the product less viscous. Generally speaking, the amount of enzyme is slightly higher than the previously described minimum level of 0.01%, typically a level of from 0.0125% to 0.0130%. The exact amount is not critical, providing that the product is sufficiently thin for spraying through conventional piston pump sprayers.

The product may be employed as a straight feed in the condition in which it is sold, it may be mixed with a meal feed; it may be sprayed upon dry meal feeds or pelletized feeds, or it may be poured on dry feeds as a top dressing. In short, it may be fed in the same general ways as molasses is now utilized.

Quite surprisingly, as mentioned heretofore, up to as much as 5% to 10% of a conventional dry grain feed in the form of a meal, pellets or the like, may be replaced with the liquid starch product of this invention on a dry weight basis without any significant decrease in animal weight gain and without any loss in feed efficiency or feed conversion. This will be demonstrated in the examples given below.

The following examples are offered to further illustrate, but not limit, the process of this invention.

EXAMPLE 1

Whole corn kernels were obtained and a batch thereof was fed through a grain scalper to remove any adulterating materials. Thereafter, the whole kernel corn was size reduced in a hammer mill to a size of all of the particles passing through a 0.02 inch screen. The average particle diameter was found to be less than 300 microns as measured. Thereafter, water was added until the level was 70% water and 30% whole corn size reduced to the particle size specified above. This product was continually mixed, the water being at ambient conditions, until a uniform slurry was obtained. Thereafter, the product was fed through a hydrothermal jet cooker made by the Hydrothermal Corporation of Milwaukee, Wisconsin. The temperature attained was 250° F. and the product emitted from the jet cooker, which has jacketed steam maintained therearound at 100 psig., was found to be about 200° F. The product was examined and found to contain substantially completely gelatinized starch. The gelatinization occurred nearly instantaneously with the cooking in the hydro-cooker 800 as previously described. Thereafter, the product was fed into a batch mixer under heat exchange conditions to decrease the product temperature to about 150° F. Amylase emzyme was added at the level of 0.05% by weight and the mixer was continually operated for a five minute period. The mixer employed was a Sprout-Waldren mixer. After five minutes of mixing, 1% by weight of phosphoric acid was added and the product was cooled. After cooling, one-half percent of a preservative which comprised a mixture of proprionic acid, acetic acid and benzoic acid was added.

The product was found to be a yellowish colored stable emulsion which did not separate into layers. Examination of the product showed that the enzyme had partially converted the starch into sugars. This product and the test of Example 2, represent the product of my prior patent.

EXAMPLE 2

A study was conducted to determine the effect of replacing ground corn with the liquid hydrothermally processed and cooked whole starch product of this invention. The study was conducted to determine the effect on the growth rate, feed intake, and feed conversion of broiler chicks.

Day old broiler chicks were randomly divided into 24 lots of 10 chicks each. Three lots were randomly assigned to each of eight test diets. Cages were assigned to the lots at random. All birds were weighed at 0, 1, 2, 4, 6, and 8 weeks of age.

Composition of the test diets is shown in Table I below. A 24% protein, broiler starter diet served as control. The experimental diets were prepared by including 5%, 10% or 15% (on a dry matter basis) of the liquid starch product of this invention substituted at the expense of the ground corn. One-half of each ration was pelleted and crumbled. The product of this invention as employed, was product prepared as described in Example 1 above.

All lots were fed control diet mash during the first week and then switched to their respective test diets. Collective weight gain, feed conversion and feed intake data were analyzed for significant differences.

The average cumulative weight gain data are presented in Table II. There were no significant differences in cumulative weight gain in any period. While total gains were similar or slightly lower on 5% and 10% substitution of the product of this invention for the ground corn diet, use of 15% substitution of the product of this invention resulted in the highest gain. In the case of 15% substitution, diet mash resulted in a slightly higher weight gain over the crumbles, while the reverse was true for all other diets.

The cumulative feed intake data are shown in Table III. There were no significant differences except in the second week. In the case of the control diet, total intake of the mash was over 300 grams more per bird than crumbles. For all other diets, this difference was much lower. This may indicate that some of the inherent benefits of pelletizing, i.e., less waste, easier handling, and better feed efficiency, were still obtained when the liquid starch product of this invention was employed in the diet.

Table IV shows the average cumulative feed conversion (feed/gain ratio). All the diets containing liquid starch product of this invention had a better feed conversion than the control mash diet. Here also, the improvement obtained by pelletizing diets containing the product of this invention is much lower than the improvement obtained by pelleting the control diet.

While there are no significant differences in weight gains when using the control diets or the liquid starch product of this invention, the results of this study indicate that some of the benefits of pelletizing the control mash are still obtained by replacing part of the ground corn with the product of this invention.

TABLE 1
COMPOSITION OF EXPERIMENTAL DIETS USED IN THE CHICK GROWTH STUDY

|  | Control Diet | 5% LSP Diet | 10% LSP Diet | 15% LSP Diet |
|---|---|---|---|---|
| Soybean meal, lbs. | 39.0 | 39.5 | 39.0 | 39.0 |
| Corn, ground, lbs. | 23.5 | 18.5 | 13.5 | 8.5 |
| Hydrothermally processed corn, lbs. | — | 15.0 | 30.0 | 45.0 |
| Sorghum grain, ground, lbs. | 22.5 | 22.5 | 22.5 | 22.5 |
| Alfalfa meal, lbs. | 2.5 | 2.5 | 2.5 | 2.5 |
| Fish meal, lbs. | 4.0 | 4.0 | 4.0 | 4.0 |
| Animal fat, lbs. | 5.0 | 5.0 | 5.0 | 5.0 |
| Dicalcium phosphate, lbs. | 1.0 | 0.8 | 0.6 | 0.4 |
| Limestone, ground, lbs. | 1.0 | 1.12 | 1.25 | 1.37 |
| Salt, lbs. | 0.5 | 0.5 | 0.5 | 0.5 |
| Vitamin A (10,000 IU/g), g | 20.0 | 20.0 | 20.0 | 20.0 |
| Vitamin $D_3$ (15,000 IU/g), g | 8.0 | 8.0 | 8.0 | 8.0 |
| Vitamin $B_{12}$ (20 mg/lb), g | 10.0 | 10.0 | 10.0 | 10.0 |
| B-Complex (1233), g | 45.0 | 45.0 | 45.0 | 45.0 |
| D-L-Methionine, g | 35.0 | 35.0 | 35.0 | 35.0 |
| Choline Chloride (50%), g | 40.0 | 40.0 | 40.0 | 40.0 |
| Trace mineral mix (Z-10), g | 23.0 | 23.0 | 23.0 | 23.0 |
| Corn, ground, g | 273.0 | 273.0 | 273.0 | 273.0 |

*One-half of each diet was pelleted and crumbled.
*Hydrothermally processed corn containing 30% dry matter, 1% phosphoric acid, and 0.5% propionic acid.
LSP = Liquid Starch Product of this invention processed as described in Example 1 containing 30% whole corn, 1.0%. phosphoric acid, enzyme deactivated, and 0.5% proprionic acid.

TABLE 2
AVERAGE CUMULATIVE WEIGHT GAIN (Grams per bird)

|  | Control | 5% LSP | 10% LSP | 15% LSP |
|---|---|---|---|---|
| 0–1 week (all groups were fed control mash during this period) | | | | |
| Mash | 81.3 | 79.0 | 76.7 | 80.3 |
| Crumbles | 84.3 | 77.3 | 80.0 | 79.3 |
| Average | 82.8 | 78.2 | 78.4 | 79.8 |
| 0–2 Weeks | | | | |
| Mash | 249.3 | 246.0 | 232.0 | 246.0 |
| Crumbles | 253.0 | 245.0 | 243.3 | 252.3 |
| Average | 251.0 | 245.5 | 237.7 | 249.0 |
| 0–4 Weeks | | | | |
| Mash | 806.0 | 820.7 | 781.0 | 823.7 |
| Crumbles | 836.3 | 822.0 | 816.3 | 835.0 |
| Average | 821.2 | 821.4 | 798.7 | 829.4 |
| 0–6 Weeks | | | | |
| Mash | 1535.7 | 1565.3 | 1479.1 | 1658.7 |
| Crumbles | 1578.0 | 1568.0 | 1595.3 | 1618.7 |
| Average | 1556.9 | 1566.7 | 1537.5 | 1638.7 |
| 0–8 Weeks | | | | |
| Mash | 2272.7 | 2282.7 | 2226.3 | 2356.7 |
| Crumbles | 2344.0 | 2310.7 | 2254.0 | 2346.7 |
| Average | 2308.4 | 2296.7 | 2240.2 | 2351.7 |

TABLE 3
AVERAGE CUMULATIVE FEED INTAKE (GRAMS/BIRD)

|  | Control | 5% LSP | 10% LSP | 15% LSP |
|---|---|---|---|---|
| 0–1 Week (All groups were fed control mash during this period) | | | | |
| Mash | 106.3 | 106.3 | 106.7 | 109.0 |
| Crumbles | 117.7 | 108.7 | 113.3 | 111.0 |
| Average | 112.0 | 107.5 | 110.0 | 110.0 |
| 0–2 Weeks | | | | |
| Mash | 343.0 | 379.7 | 418.3 | 419.3 |
| Crumbles | 361.0 | 309.7 | 398.0 | 378.0 |
| Average | 352.0 | 34.7 | 408.2 | 398.7 |
| 0–4 Weeks | | | | |
| Mash | 1377.0 | 1460.7 | 1341.3 | 1439.0 |
| Crumbles | 1356.7 | 1427.7 | 1405.3 | 1388.3 |
| Average | 1366.9 | 1444.2 | 1373.3 | 1413.7 |

TABLE 3-continued
AVERAGE CUMULATIVE FEED INTAKE (GRAMS/BIRD)

|  | Control | 5% LSP | 10% LSP | 15% LSP |
|---|---|---|---|---|
| 0-6 Weeks |  |  |  |  |
| Mash | 3853.7 | 3803.0 | 3648.7 | 3923.3 |
| Crumbles | 3647.7 | 3757.7 | 3696.7 | 3827.0 |
| Average | 3750.7 | 3780.4 | 3672.7 | 3875.2 |
| 0-8 Weeks |  |  |  |  |
| Mash | 6022.3 | 5943.7 | 5757.7 | 6095.0 |
| Crumbles | 5699.0 | 5949.0 | 5752.3 | 5927.3 |
| Average | 5860.7 | 5946.4 | 5755.0 | 6011.2 |

TABLE 4
AVERAGE CUMULATIVE FEED CONVERSION (FEED/GAIN)

|  | Control | 5% LSP | 10% LSP | 15% LSP |
|---|---|---|---|---|
| 0-1 Week (All groups were fed control mash during this period) |  |  |  |  |
| Mash | 1.312 | 1.352 | 1.389 | 1.360 |
| Crumbles | 1.328 | 1.406 | 1.429 | 1.398 |
| Average | 1.320 | 1.379 | 1.409 | 1.379 |
| 0-2 Weeks |  |  |  |  |
| Mash | 1.374 | 1.546 | 1.806 | 1.697 |
| Crumbles | 1.427 | 1.265 | 1.638 | 1.501 |
| Average | 1.401 | 1.406 | 1.722 | 1.599 |
| 0-4 Weeks |  |  |  |  |
| Mash | 1.708 | 1.780 | 1.719 | 1.745 |
| Crumbles | 1.622 | 1.736 | 1.721 | 1.663 |
| Average | 1.665 | 1.758 | 1.720 | 1.704 |
| 0-6 Weeks |  |  |  |  |
| Mash | 2.511 | 2.431 | 2.476 | 2.365 |
| Crumbles | 2.315 | 2.397 | 2.317 | 2.365 |
| Average | 2.413 | 2.414 | 2.397 | 2.365 |
| 0-8 Weeks |  |  |  |  |
| Mash | 2.651 | 2.604 | 2.586 | 2.585 |
| Crumbles | 2.432 | 2.574 | 2.553 | 2.527 |
| Average | 2.542 | 2.589 | 2.570 | 2.556 |

EXAMPLE 3

The product of Example 1 was prepared in exactly the manner described in Example 1, except for the following changes: In the initial size reduction step, the average particle size was reduced to only within the range of 400 to 500 microns. After the product exited from the HydroCooker 800, it was held for three minutes at this elevated temperature in an insulated conveying pipe as it was being moved from the cooker to the cooling tank.

The measured lactic acid content of the product shown in this Example was 5%. The measured maltose value for the product of Example 1 was 200 and for this example was 500.

The product prepared in accordance with this example was used as a sealer for hay and shelled corn by spraying the material from a piston pump spray at a pressure within the range of 200 to 250 psi on hay and shelled corn. No other silage spray sealer treatment was employed. The product was stored for six months and thereafter examined. It was found that the dried film of the liquid emulsion product of this invention functioned as an effective sealing aid.

EXAMPLE 4

The product prepared in the manner shown in Exhibit 3 was utilized in feed replacement testing for cattle in the manner set forth below.

One hundred and seventy Hereford×Angus steers were purchased. The steers were given routine feedlot vaccinations, ear-tagged, and weighed. The steers were given ample time to adapt to their surroundings and recover from shipping stress. The steers were stratified by weight, and then randomly allotted to seventeen pens of ten steers each. Four pens were placed on each treatment. One pen of ten steers was designated as an initial kill group and slaughtered for specified gravity analysis. Treatments were 0, 5%, 10% and 15% of the liquid starch product (L.S.P.) in the total diet. The rations fed for the one hundred twenty-five day trial are shown in Table 1. The rations were formulated to be isonitrogenous with 11.5% protein in each ration. The liquid starch product was added on "as is" basis to all rations. The calculated chemical composition of each ration is also shown in Table 1. Initial and final weights were taken after an overnight fast from feed and water. Interim weights were taken at twenty-eight day intervals. The animals were fed ad libitum once daily from fence-line bunks. Feed intake was recorded on a daily basis.

The steers were slaughtered and carcass data on all cattle were obtained. Three steers from each pen were selected on the basis of their gain performance and carcass specific gravity data were obtained on these animals. The criteria used to evaluate the liquid starch product were gain, feed efficiency, specific gravity data, and carcass parameters.

TABLE 1
RATION COMPOSITION

|  | Ration Number | | | |
|---|---|---|---|---|
| Ingredient, % of the ration (as is) | 1 | 2 | 3 | 4 |
| Cottonseed hulls | 15.0 | 15.0 | 15.0 | 15.0 |
| Steam flaked milo | 71.4 | 64.6 | 58.3 | 51.9 |
| Cottonseed meal | 1.6 | 3.4 | 4.7 | 6.1 |
| Supplement | 6.0 | 6.0 | 6.0 | 6.0 |
| Cane molasses | 6.0 | 6.0 | 6.0 | 6.0 |
| Liquid starch product | 0.0 | 5.0 | 10.0 | 15.0 |
|  | Calculated Chemical Composition (as fed) | | | |
| Protein | 11.5 | 11.5 | 11.5 | 11.5 |
| ME Mcal/kg* | 2.31 | 2.18 | 2.08 | 1.92 |
| NEm* | 1.49 | 1.41 | 1.32 | 1.24 |
| NEp* | 1.03 | 0.97 | 0.90 | 0.84 |
| Ca.* | .42 | .42 | .42 | .43 |
| P.* | .28 | .28 | .28 | .28 |
| Dry Matter |  |  |  |  |
| ME = Metabolizable energy** |  |  |  |  |
| NEm = Net energy maintenance |  |  |  |  |
| NEp = Net energy production |  |  |  |  |

*Assumes no contribution from liquid starch product.
**These values are calculated from the carcass specific gravity data as presented by the Lofgreen method. See Lofgreen and K. K. Otagaki 1960. The net energy of blackstrap molasses for fattening steers as determined by a comparative slaughter technique. J. Anim. Science 19:392, which is incorporated herein by reference.

The feedlot performance and carcass characteristics are shown in Table 2.

TABLE 2
EFFECT OF LIQUID STARCH PRODUCT AS AN ENERGY SOURCE FOR FINISHING STEERS ON FEEDLOT PERFORMANCE AND CARCASS CHARACTERISTICS OF STEERS. 125 DAYS.

| Treatment | Control | 5% Liquid Starch Product | 10% Liquid Starch Product | 15% Liquid Starch Product |
|---|---|---|---|---|
| Feedlot Performance |  |  |  |  |
| No. of steers | 40 | 40 | 40 | 40 |
| Initial wt., lb. | 672.4 | 676.7 | 671.9 | 668.9 |
| Final wt., lb. | 1011.7 | 1034.4 | 1012.1 | 998.8 |
| Gain, lb. | 339.3 | 357.7 | 340.1 | 329.8 |
| Average daily gain, lb. | 2.71 | 2.86 | 2.72 | 2.64 |
| Feed/Day | 22.97 | 25.03 | 24.79 | 25.39 |

TABLE 2-continued
EFFECT OF LIQUID STARCH PRODUCT
AS AN ENERGY SOURCE FOR FINISHING STEERS
ON FEEDLOT PERFORMANCE AND CARCASS
CHARACTERISTICS OF STEERS. 125 DAYS.

| Treatment | Control | 5% Liquid Starch Product | 10% Liquid Starch Product | 15% Liquid Starch Product |
|---|---|---|---|---|
| Feed/gain | 8.46 | 8.74 | 9.11 | 9.62 |
| Carcass Characteristics | | | | |
| Carcass weight | 612.85 | 620.5 | 604.5 | 603.1 |
| Dressing percent | 61 | 60 | 59.7 | 60 |
| Carcass graded | 11.6 | 11.8 | 11.3 | 11.9 |
| Marbling score[a] | 5.34 | 5.42 | 5.17 | 5.42 |
| Yield grade | 2.645 | 2.80 | 2.65 | 2.65 |
| Cutability percent | 50.82 | 50.45 | 50.83 | 50.76 |
| Backfat, inches | .415 | .49 | .42 | .42 |
| Kidney fat, percent | 2.85 | 2.85 | 2.86 | 2.83 |
| Ribeye area, sq. inch | 1198 | 12.17 | 11.93 | 11.89 |
| Abscessed liver, percent | 10 | 12.5 | 7.5 | 5 |

[a]Small = 5; modest = 6; moderate = 7; etc.

The data were statistically analyzed using analysis of variance. Mean separation was done using the technique of Least Significant Difference. There were no significant differences in average daily gain in any of the four treatments. However, all three liquid starch product treatments consumed more feed than did the Control. There was no significant difference in feed efficiency between the Control and the 5% level of liquid starch product; however, the Controls were significantly more efficient than either the 10% or 15% liquid starch product fed cattle.

The theoretical calculation as to the net energy value of liquid starch product are shown in Table 3.

TABLE 3
CALCULATED VALUES FOR LIQUID
STARCH PRODUCT IN FINISHING RATIONS

| | Control | 5% | 10% | 15% |
|---|---|---|---|---|
| Calculated NEm, Mcal/kg | 1.49 | 1.41 | 1.32 | 1.24 |
| Actual NEm, Mcal/kg | 1.49 | 1.49 | 1.45 | 1.39 |
| Calculated NEp, Mcal/kg | 1.03 | .97 | .90 | .84 |
| Actual NEp, Mcal/kg | 1.10 | 1.04 | .99 | .94 |
| Predicted gain | 2.56 | 2.63 | 2.36 | 2.23 |
| Actual gain | 2.71 | 2.86 | 2.72 | 2.64 |
| Values for liquid starch product at this level of use in the diet | | | | |
| NEm Mcal/kg | 0 | 1.87 | 1.34 | 1.00 |
| NEp Mcal/kg | 0 | 1.21 | .87 | .65 |

In Table 3 the Control ration was calculated with NEm of 1.49, and NEp of 1.03. The use of specific gravity data and gain data indicate that the NEm should be 1.49 and the actual NEp 1.10. The use of these actual NEm, NEp's will then correctly predict the gain of 2.71. The rations containing 5, 10, and 15% liquid starch product were calculated assuming a 0 value for all parameters for the liquid starch product. These calculated NEm, NEp's were then used to predict the gain. Actual gain data and specific gravity data were then used to calculate the value of liquid starch product in these rations at the various levels. The summation of all the data would indicate that at 5% of the ration, the liquid starch product can be a very effective energy source as well as feed conditioner in the ration of finishing steers. At levels in excess of 10%, increased value is not noted.

What is claimed is:

1. A method of making a stable liquid starch emulsion animal feed product, said method consisting essentially of size reducing a whole starch material which is substantially free of non-protein nitrogen additives to a particle size which is sufficiently small to allow effective enzyme digestion of said material,
   slurrying said size reduced material with water to provide a slurry having a solids content within the range of from about 15% to about 55% by weight,
   hydrothermally cooking said slurried mixture in a cooker at a temperature sufficiently high to at least partially gelatinize the starch of said starch material,
   passing said hydrothermally cooked material after it exits from said cooker through an insulated transfer means at the temperatures at which cooking is completed for from about one minutes to about four minutes to a cooked slurry hold tank,
   adding to said cooked slurry a small but effective amount of a starch digesting enzyme, to at least partially enzymatically hydrolyze said starch to sugars, and
   mixing the cooked slurry to which the enzyme has been added at a temperature below boiling for period of time of from 5 to 15 minutes to provide a stable emulsion and thereafter
   treating said cooked product with a mineral acid enzyme deactivating agent.

2. The method of claim 1 wherein said passing occurs for from about two to about three minutes.

3. The method of claim 1 wherein the size reduction step said starch material is size reduced to a particle size within the range of 400 to 500 microns.

4. The process of claim 1 wherein the product has a maltose value within the range of from 400 to 550.

5. The process of claim 4 wherein the maltose value is from 500 to 550.

6. The process of claim 1 wherein the processed product has a lactic acid content within the range of from about 3% to about 10% by weight.

7. The process of claim 1 wherein the processed product has a lactic acid content within the range of from about 4% to about 6% by weight.

8. The process of claim 1 wherein the amount of enzyme is from about 0.0125% to about 0.0130%.

9. The product of the process of claim 1.

10. A process of effectively sealing grain and silage to prevent spoilage, with a wholly nutritious but still effective sealer consisting essentially of preparing a liquid starch emulsion product by size reducing a whole starch material which is substantially free of non-protein nitrogen additives to a particle size which is sufficiently small to allow effective enzyme digestion of said materials,
   slurrying said size reduced material with water to provide a slurry having a solids content within the range of from about 15% to about 55% by weight,
   hydrothermally cooking said slurried mixture in a cooker at a temperature sufficiently high to at least partially gelatinize the starch of said starch material,
   passing said hydrothermally cooked material after it exits from said cooker through an insulated transfer means at the temperatures at which cooking is completed for from about one minute to about four minutes to a cooked slurry hold tank, adding to said cooked slurry a small but effective amount of a starch digesting enzyme, to at least partially enzymatically hydrolyze said starch to sugars, and mixing the cooked slurry to which the enzyme has been added at a temperature below boiling for a period of time of from 5 to 15 minutes to provide a stable emulsion, and thereafter treating said cooked product with a mineral acid enzyme deactivating agent, spraying said liquid starch emulsion material onto grain or silage to provide a film like covering thereon which when dry provides effective sealing and prevents spoilage of said sprayed grain or silage.

* * * * *